(12) United States Patent
Barnes et al.

(10) Patent No.: US 11,640,177 B2
(45) Date of Patent: May 2, 2023

(54) CONTROL AND MAPPING BASED ON MULTI-VEHICLE SENSOR FUSION

(71) Applicant: Deere & Company, Moline, IL (US)

(72) Inventors: Kenneth Barnes, Dubuque, IA (US); Michael G. Kean, Maquoketa, IA (US); Reginald M. Bindl, Bettendorf, IA (US)

(73) Assignee: Deere & Company, Moline, IL (US)

( * ) Notice: Subject to any disclaimer, the term of this patent is extended or adjusted under 35 U.S.C. 154(b) by 301 days.

(21) Appl. No.: 16/412,976

(22) Filed: May 15, 2019

(65) Prior Publication Data

US 2020/0363820 A1 Nov. 19, 2020

(51) Int. Cl.
*G05D 1/02* (2020.01)
*G07C 5/08* (2006.01)
*H04L 67/12* (2022.01)

(52) U.S. Cl.
CPC ......... *G05D 1/0297* (2013.01); *G05D 1/0285* (2013.01); *G07C 5/08* (2013.01); *H04L 67/12* (2013.01); *G05D 2201/0202* (2013.01)

(58) Field of Classification Search
CPC ............... G05D 1/0297; G05D 1/0285; G05D 2201/0202; G05D 1/0251; G05D 1/0257; G05D 1/0223; G05D 1/0214; G05D 1/0278; G05D 1/0276; G05D 1/0808; G05D 1/101; G05D 2201/0213; G07C 5/08; H04L 67/12; H04W 4/38; H04W 4/40; H04W 4/02; H04W 4/46; H04W 84/18; H04W 4/026; B60W 10/10; B60W 30/00; B60W 30/09; B60W 30/12; B60W 30/18163; B60W 30/14; B60W 2554/408; B60R 16/023; B60R 16/0232

See application file for complete search history.

(56) References Cited

U.S. PATENT DOCUMENTS

| | | | |
|---|---|---|---|
| 8,935,319 B2 | 1/2015 | Calo et al. | |
| 9,117,185 B2 | 8/2015 | Vian et al. | |
| 9,641,962 B2 | 5/2017 | Kilworth et al. | |
| 2017/0031365 A1 | 2/2017 | Ramanathan et al. | |
| 2018/0373266 A1* | 12/2018 | Sethu | H04W 4/46 |
| 2020/0124423 A1* | 4/2020 | Jiang | G08G 1/0141 |
| 2020/0334887 A1* | 10/2020 | Salfity | G06K 9/726 |

FOREIGN PATENT DOCUMENTS

| | | |
|---|---|---|
| DE | 102008061252 A1 | 5/2010 |
| DE | 102016212623 A1 | 7/2015 |
| DE | 102018115198 A1 | 12/2018 |

OTHER PUBLICATIONS

German Search Report issued in counterpart application No. 102020205897.0 dated Jan. 13, 2021 (10 pages).

* cited by examiner

*Primary Examiner* — Shon G Foley
(74) *Attorney, Agent, or Firm* — Joseph R. Kelly; Kelly, Holt & Christenson, PLLC (57) ABSTRACT

A sensor data processing and control system acquires data from multiple, disparate sources on a worksite. A plurality of different data pipes are generated for different action systems. The action systems receive data through a corresponding data pipe and generate action signals, based upon aggregated and fused data received through the data pipe.

19 Claims, 9 Drawing Sheets

CONTROL AND MAPPING BASED ON MULTI-VEHICLE SENSOR FUSION

FIELD OF THE DESCRIPTION

The present description relates to work vehicles. More specifically, the present description relates to generating mapping and action signals by aggregating and fusing sensor data from multiple different work machines.

BACKGROUND

There are a wide variety of different types of work machines. Those work machines can include such things as loaders, dump trucks, articulated vehicles, scrapers, excavators, among others. These types of machines are often deployed on a worksite to perform various operations at the worksite.

Each of these machines may have one or more different sensors deployed on them. For instance, they may have a position sensor (such as a GPS receiver or other position sensor) that senses a geographic position of the vehicle. They may have inertial measurement units (IMUs), cameras (such as backup cameras or other cameras), RADAR or LIDAR systems, among a variety of other sensors.

In addition, a worksite may have fixed or static sensors that are mounted at the worksite. Such sensors can include cameras, or other sensors that are positioned to sense a desired variable at the worksite. Further, worksites may have unmanned ground vehicles or unmanned aerial vehicles that have sensors on them as well. Those sensors may, for instance, capture images or other information about the worksite.

The discussion above is merely provided for general background information and is not intended to be used as an aid in determining the scope of the claimed subject matter.

SUMMARY

A sensor data processing and control system acquires data from multiple, disparate sources on a worksite. A plurality of different data pipes are generated for different action systems. The action systems receive data through a corresponding data pipe and generate action signals, based upon aggregated and fused data received through the data pipe.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
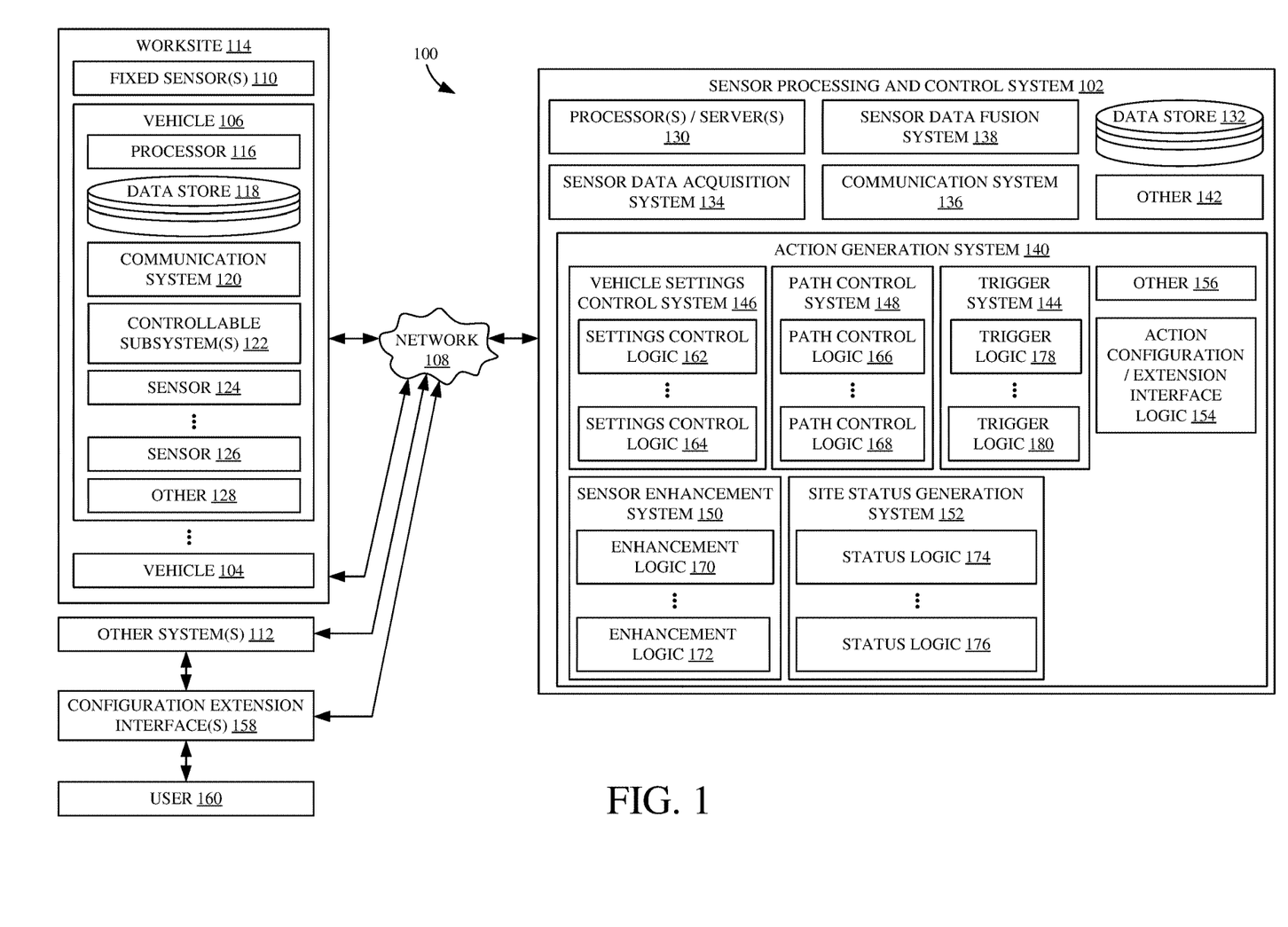
FIG. 1 is a block diagram showing one example of a sensor processing architecture.

FIG. 1 is a block diagram of one example of a sensor processing architecture 100. Architecture 100 shows that sensor processing and control system 102 is coupled to various vehicles 104-106 through network 108. System 102 can also be connected to one or more fixed sensors 110 and any of a wide variety of other systems 112, also through network 108. Therefore, in one example, network 108 can be a wide area network, a local area network, a near field communication network, a cellular network, or any of a wide variety of other networks or combinations of networks.

The vehicles 104-106 and fixed sensors 110 are illustratively deployed at a worksite 114. The worksite may be a construction site, a quarry, or any of a wide variety of other worksites where vehicles 104-106 are used to perform various different operations.

Thus, vehicles 104-106 can be any of a wide variety of different types of vehicles. They can be loaders, bulldozers, dump trucks, articulated vehicles, excavators, compactors or rollers, backhoes, graders, scrapers, combinations of these and other vehicles (or work machines), etc. Each of the vehicles 104-106 can have a processor 116, data store 118, communication system 120, controllable subsystems 122, a set of sensors 124-126, and any of a wide variety of other items 128. Depending upon the type of vehicle, controllable subsystems 122 can include such things as a propulsion subsystem (such as an engine or other power source, a drive train, ground-engaging elements, such as wheels or tracks), operating equipment (such as a bucket, a scraper blade), and a wide variety of other items. Communication system 120 illustratively allows the items on vehicle 106 to communicate with one another, and to communicate over network 108. Therefore, communication system 120 illustratively facilitates communication over network 108, and it can include a controller area network (CAN) communication system or other system that allows the items on the vehicle to communicate with one another.

Sensors 124-126 can include a wide variety of different types of sensors. For instance, they can include a position sensor (such as a GPS receiver or other position sensor that provides a geographic position and/or pose of vehicle 106), an inertial measurement unit (such as an accelerometer or other item that senses accelerations imparted on vehicle 106), various different types of cameras, such as a backup camera, a set of stereo cameras, a camera that is provided with corresponding logic for sensing bucket volume, a forward looking camera, etc. The cameras can include video cameras or other image capture devices. The sensors can include RADAR and/or LIDAR or other similar types of sensors, they can include speed sensors, sensors that sense machine settings or machine operational parameters, such as fuel consumption, machine configuration sensors that sense the configuration of the machine on which they are deployed, among a wide variety of other sensors.

In addition, any of vehicles 104-106 can be unmanned aerial vehicles or unmanned ground vehicles. Thus, they can include sensors such as image capture devices, video capture devices, or a wide variety of other sensors that can be carried by such vehicles.

Fixed sensors 110 can include any types of sensors that are fixed at a worksite 114. They can, for instance, be cameras, vibration sensors, temperature or soil characteristic sensors, weather sensors, or any of a wide variety of other sensors that sense desired characteristics with respect to worksite 114.

Sensor processing and control system 102 illustratively receives data from the sensors at worksite 114. It can receive sensor data from other systems 112 or access those systems for other reasons.

Sensor processing and control system 102 can also be located on one or more of the vehicles 104-106 or elsewhere. It is shown as a separate system connected over network 108 for the purposes of example only. It can be located at a remote server environment (such as in the cloud) or elsewhere as well. Some of those scenarios are described in greater detail below.

In the example shown in FIG. 1, sensor processing and control system 102 illustratively includes one or more processors or servers 130, data store 132, sensor data acquisition system 134, communication system 136, sensor data fusion system 138, action generation system 140, and it can include a wide variety of other items 142. Action generation system 140 illustratively includes trigger system 144, vehicle settings control system 146, path control system 148, sensor enhancement system 150, site status generation system 152, action configuration/extension interface logic 154, and it can include other items 156.

Briefly, in operation, action configuration/extension interface logic 154 exposes one or more configuration/extension interfaces 158. A user 160 can interact with those interfaces 158 in order to configure various items on sensor processing and control system 102. Sensor data acquisition system 134 acquires sensor data from various sensors 110 and 124-126 at worksite 114. It can acquire data from certain sensors on different vehicles 104-106. Sensor data fusion system 138 then fuses or otherwise configures data so that different data pipes (that provide different types of data) can be provided to the different action systems in action generation system 140. For instance, it may be that vehicle settings control system 146 needs a certain subset of the sensor data in order to control vehicle settings on the different vehicles 104-106. At the same time, it may be that path control system 148 needs a different subset of the sensor data in order to generate path control signals to control the path of the different vehicles 104-106. Each of the different action systems 146, 148, 150, 152 and 156 may need its own subset of sensor data in order to generate its own action and/or control signals. Thus, sensor data fusion system 138 can be configured to generate different data pipes that provide the different subsets of data to the different action systems in action generation system 140. Sensor data fusion system 138 is described in greater detail below with respect to FIG. 2.

Each of the action systems 146-156 illustratively includes its own control logic or other action logic in order to perform control operations or other actions based upon the data received from its corresponding data pipe. Thus, for instance, vehicle settings control system 146 can include a plurality of different types of settings control logic 162-164. Each item of logic 162-164 can generate different control signals in order to control different vehicles 104-106, different settings on vehicles 104-106 at worksite 114, etc.

Similarly, path control system 148 may include one or more different sets of path control logic 166-168. Each item of logic 166-168 can be used to generate control signals to control the steering subsystems on the various vehicles 104-106 in order to control the path that those vehicles take, on worksite 114.

Sensor enhancement system 150 can include different sets of enhancement logic 170-172. Those items of logic can be used to enhance the output of various different types of sensors. For instance, it may be that sensor 124 on vehicle 106 is a RADAR sensor that generates an output indicative of objects in the area surrounding vehicle 106. However, it may be that vehicle 106 does not have line of sight to different areas on worksite 114. In that case, a RADAR sensor on vehicle 104 can be used to augment the RADAR sensor on vehicle 106 in order to identify objects on worksite 114 that the RADAR sensor on vehicle 106 will not be able to sense. In another example, it may be that a fixed camera sensor 110 that is trained to capture images in a particular location on worksite 114 can be used to augment the RADAR sensor or image capture sensor on vehicle 106. It may be, for instance, that fixed sensor 110 can capture images in an area where objects cannot be sensed by the sensors on vehicle 106. Thus, the sensor outputs from vehicle 106 can be enhanced using the sensor outputs from fixed sensors 110 or the sensors on vehicle 104, etc. The items of enhancement logic 170-172 can be configured to do this. They can enhance sensors in a variety of different ways. Sensor signals from different vehicles can be combined to increase accuracy of the sensor output. They can be combined to extend or increase the sensed range or area of the output, among other things.

Similarly, site status generation system 152 can include one or more different sets of status logic 174-176. Each item of status logic may be configured to generate a status output (or status indicator) indicating the status of worksite 114. Each status indicator can indicate any of a wide variety of different status items. For instance, one item of status logic 174-176 may generate an output indicative of the topology of worksite 114. It can generate multiple different topological maps at different dates so that they can be scrolled through (or otherwise accessed) in order to identify, historically, how the topology of worksite 114 has changed, or is changing, based upon the work being done by vehicles 104-106.

The items of status logic 174-176 can generate a wide variety of other mapping outputs as well. For instance, they can generate maps of the current and historic paths which vehicles 104-106 have taken on worksite 114. This may be useful for many different reasons. The vehicles 104-106 may, for instance, be performing soil compaction on worksite 114. For instance, where the vehicles are dump trucks and they are traveling over different paths on worksite 114, the dump trucks may be compacting the soil. This may mean that less compaction will need to be performed later during the operations at worksite 114. Tracking the paths of vehicles 104-106, historically, along with a variable indicating whether they are loaded or unloaded, can be used by items of logic 174-176 in order to map soil compaction on worksite 114, even before soil compactors or rollers are deployed. This is just one example of an item of status (soil compaction) that can be generated by site status generation system 152.

Each of the systems 146-152 in action generation system 140 thus receives its own data, from a corresponding data pipe generated by sensor data fusion system 138. It may be that data is continuously being received by the various systems in action generation system 140, or it may be that those items can receive data, through the corresponding data pipe from sensor data fusion system 138, in response to certain triggering criteria. Thus, trigger system 144 may include a plurality of different configurable items of trigger logic 178-180.

Each of the systems 146-152 can have their own triggering criteria, or the triggering criteria can be shared among them. For instance, it may be that some systems 146-152 need data continuously and therefore trigger logic 178 may determine whether sensor data fusion system 138 has any new data to provide in the corresponding data pipe. In another example, it may be that one of systems 146-156 only needs to be updated intermittently, periodically, or when something changes. In that case, the corresponding trigger logic 178-180 will identify when those triggering criteria occur, so that data can be obtained through the corresponding data pipe.

In one example, sensor processing and control system 102 is extendable and configurable. Therefore, action configuration/extension interface logic 154 exposes one or more interfaces 158 so that user 160 can configure system 102. For instance, user 160 can interact with interfaces 158 in order to install or configure a different action system in action generation system 140 in addition to, or instead of, those shown. In another example, user 160 can interact with interfaces 158 in order to install or configure an item of logic in an already-existing action system. For instance, if user 160 wishes vehicle settings control system 146 to control a setting on a vehicle 104-106 for which no settings control logic already exists, then user 160 can interact with interfaces 158 in order to install or configure a new item of settings control logic in vehicle settings control system 146 in order to control the new setting or group of settings that user 160 wishes to be controlled in one or more of the vehicles 104-106. User 160 can interact with interfaces 158 in order to install or configure different items of logic in the different action systems 146-156, in a similar way, in order to extend the functionality of system 140. Action configuration/extension interface logic 154 illustratively exposes interfaces 158 and detects user interaction with those interfaces and performs the desired extension or configuration operations in system 140, based upon those user interactions.

Before describing the overall operation of architecture 100 in more detail, one example of a more detailed block diagram of sensor data fusion system 138 (shown in FIG. 2) will first be described. In the example shown in FIG. 2, it can be seen that sensor data fusion system 138 has access to sensor data 182 that has been acquired by sensor data acquisition system 134. In the example shown in FIG. 2, sensor data fusion system 138 includes data aggregation system 184 (which, itself, includes different sets of aggregation/packaging logic 186-188), filtering system 190 (which, itself, can include a variety of different items of filtering logic 192-194), vehicle settings data pipe generator 196, path control data pipe generator 198, sensor enhancement data pipe generator 200, site status data pipe generator 202, a variety of other data pipe generators 204, fusion configuration/extension interface logic 206, and it can include other items 208. Fusion configuration/extension interface logic 206 exposes interfaces 158 (also shown in FIG. 1) so that user 160 can configure sensor data fusion system 138 in order to provide different data pipes for the different action systems in action generation system 140.

Figure 2:
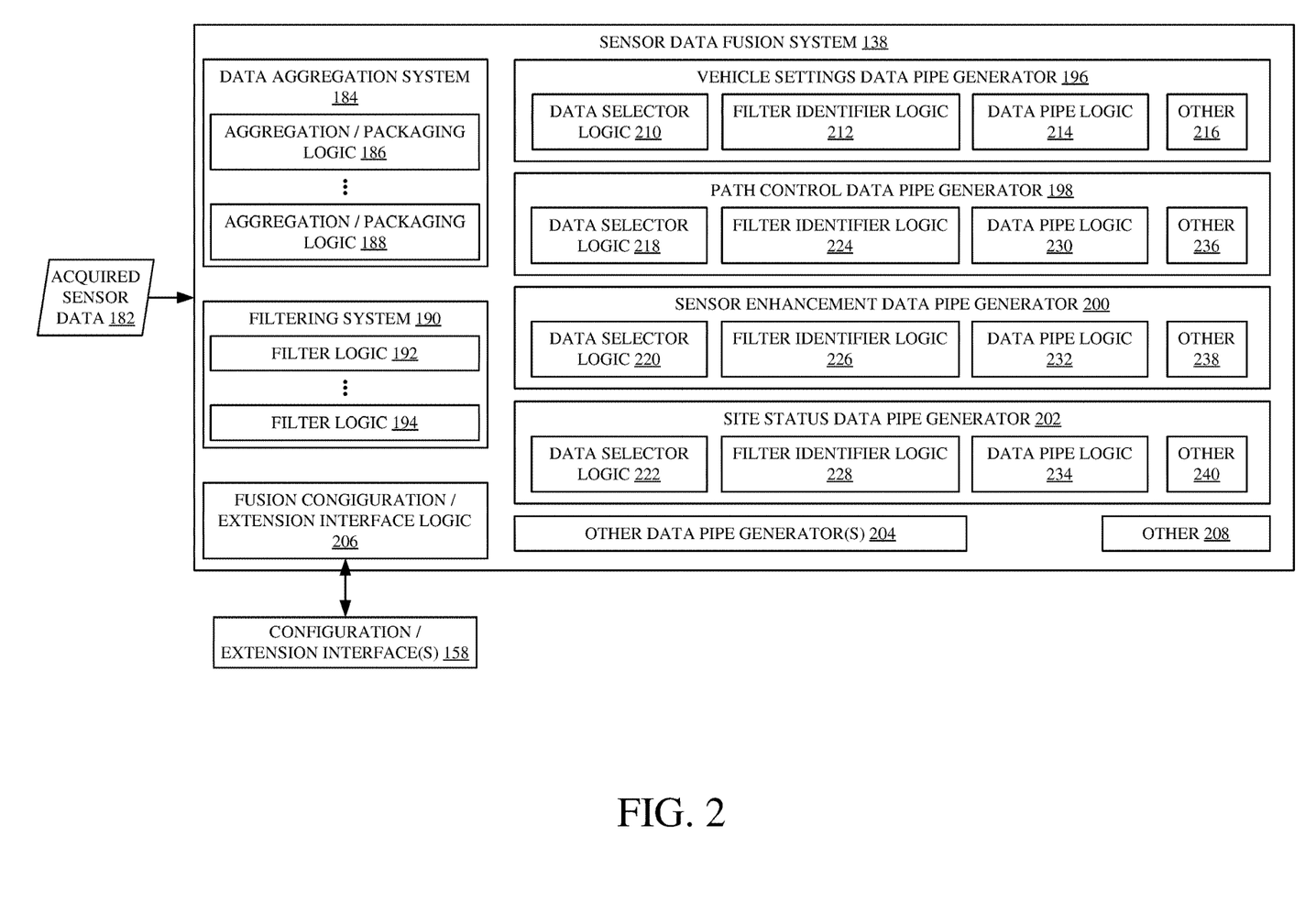
FIG. 2 is a block diagram showing one example of a sensor data fusion system in more detail.

In doing so, the user can install or configure items of aggregation/packaging logic 186-188 so that different items of sensor data 182 can be aggregated, as desired, and packaged, as desired, for a particular data pipe. The user can also configure or install different items of filtering logic 192-194 so that the data can be filtered, as desired, when generating the desired data pipe. It will be noted that user 160 can be a vehicle operator who operates one of vehicles 104-106, a construction manager, a user at a separate, remote facility, or any of a wide variety of other users.

The user can also interact with interfaces 158 in order to install or configure different data pipe generators (such as data pipe generators 196, 198, 200, 202 and 204). Each data pipe generator illustratively has logic for selecting a particular data aggregation or data package generated by logic 186-188, and for applying a filter using one or more items of filter logic 192-194. It also illustratively has data pipe logic that then arranges the selected, aggregated, and filtered data and provides it to the corresponding action system in action generation system 140 so that the action system can perform its control operation or other action based upon data received from the corresponding data pipe.

Therefore, in the example shown in FIG. 2, vehicle settings data pipe generator 196 includes data selector logic 210, filter identifier logic 212, data pipe logic 214, and it can include other items 216. Data selector logic 210 selects the data from one or more packages generated by aggregation/packaging logic 186-188, which will be used in the data pipe generated by vehicle settings data pipe generator 196. Filter identifier logic 212 illustratively identifies and applies the filter logic 192-194 that needs to be applied for the data pipe generated by vehicle settings data pipe generator 196. Data pipe logic 214 then generates the data pipe, populates it with data, and makes that data available to the items in action generation system 140 that need it to perform their operations.

Each of the other data pipe generators 198-204 also illustratively include data selector logic (shown as data selector logic 218, 220, and 222), filter identifier logic (shown as filter identifier logic 224, 226 and 228), and data pipe logic (shown as data pipe logic 230, 232 and 234). Each of the other data pipe generators can also have other items 236, 238 and 240 as well.

Figure 3:
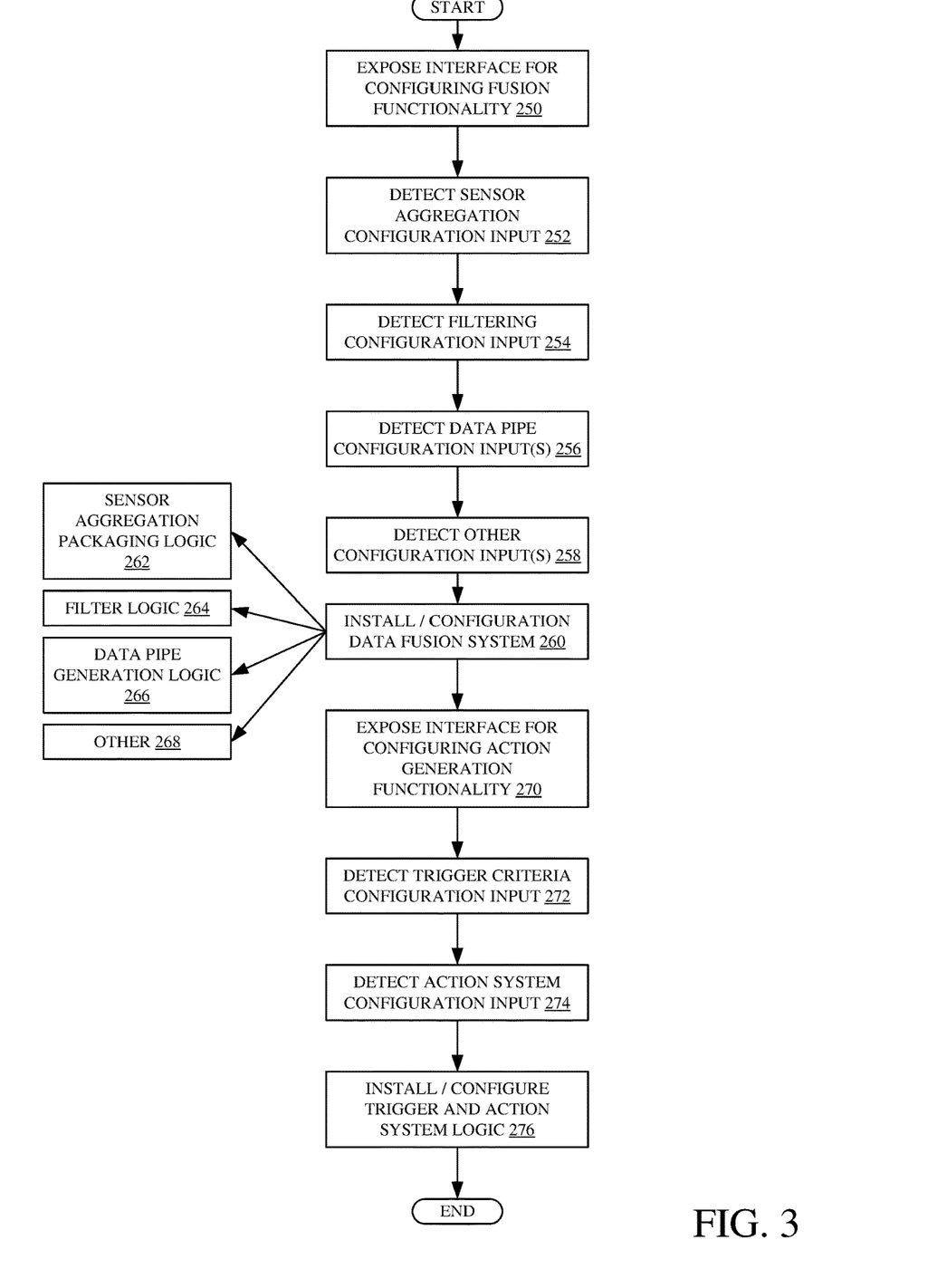
FIG. 3 is a flow diagram showing one example of configuration of the architecture illustrated in FIG. 1.

FIG. 3 is a flow diagram illustrating one example of the operation of fusion/configuration extension interface logic 206 and action configuration/extension interface logic 154, in exposing interfaces 158 and responding to user interaction with those interfaces.

In the example shown in FIG. 3, fusion configuration/extension interface logic 206 first exposes the interfaces 158 for configuring fusion functionality in sensor data fusion system 138. Exposing this interface is indicated by block 250 in the flow diagram of FIG. 3.

Logic 206 then detects user interactions configuring an item of aggregation/packaging logic 186-188. This is indicated by block 252. Similar user interactions are detected for configuring items of filter logic 192-194. This is indicated by block 254. In addition, user interactions are detected for configuring one or more different data pipe generators 196-204. Detecting these inputs is indicated by block 256 in the flow diagram of FIG. 3. Logic 206 can detect a wide variety of other configuration inputs as well, and this is indicated by block 258 in the flow diagram of FIG. 3.

Fusion configuration/extension interface logic 206 then installs the logic that is needed to generate the desired data pipe, if it does not already exist, or configures it in a way desired by user 160, if it does already exist. Installing and/or configuring the data fusion functionality to generate the desired data pipe is indicated by block 260. In one example, it installs or configures sensor aggregation/packaging logic, as indicated by block 262. In another example, it installs or configures filter logic, as indicated by block 264. It can also install or configure data pipe generation logic as indicated by block 266 and/or a wide variety of other items, as indicted by block 268.

Action configuration/extension interface logic 154 can also expose one or more interfaces 158 in order to configure action generation functionality in action generation system 140. This is indicated by block 270 in the flow diagram of FIG. 3. For instance, it can detect user inputs indicative of trigger criteria or trigger logic in trigger system 144. This is indicated by block 272. It can detect configuration inputs for existing action systems 146-156, or it can detect configuration inputs installing or configuring a new action system. This is indicated by block 274 in the flow diagram of FIG. 3. Logic 154 then installs the new action system, if it does not yet exist, or configures an existing action system, based upon the configuration inputs through interfaces 158. Installing and/or configuring the trigger and action system logic in action generation system 140 is indicated by block 246 in the flow diagram of FIG. 3.

Figure 4:
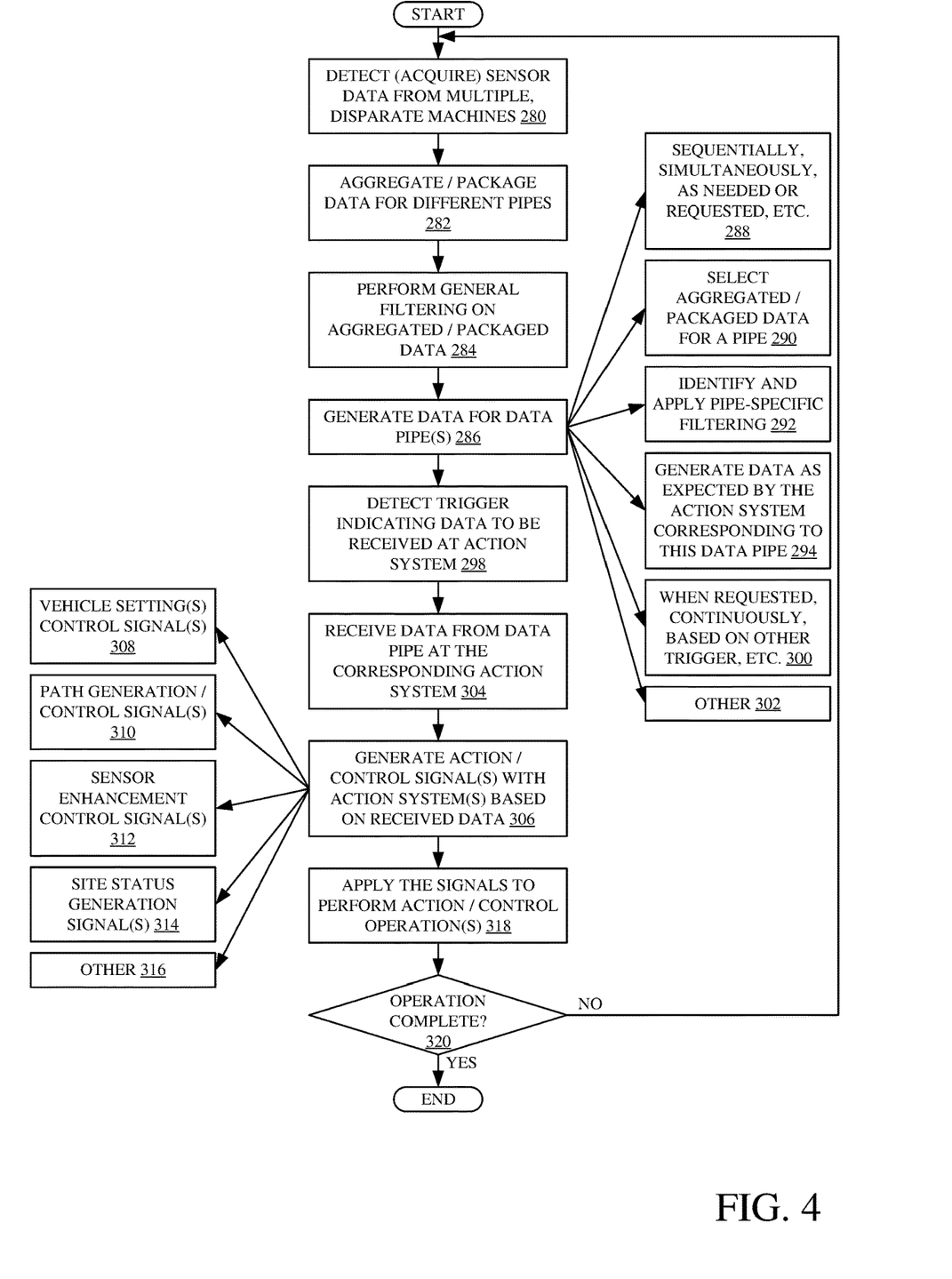
FIG. 4 is a flow diagram illustrating one example of the operation of a sensor processing and control system.

Once sensor data fusion system 138 and action generation system 140 have been configured, then architecture 100 can operate to detect sensor data across different vehicles and other sensors at worksite 114 and to perform action or control operations. FIG. 4 is a flow diagram illustrating one example of the operation of architecture 100 in doing this.

Sensor data acquisition system 134 first detects or acquires sensor data from multiple, disparate machines and/or fixed sensors on worksite 114. This is indicated by block 280 in the flow diagram of FIG. 4. Data aggregation system 184 (in sensor data fusion system 138) then aggregates and/or packages the data for the different data pipes that will be generated by the data pipe generators in system 138. Aggregating and/or packaging the data for different data pipes is indicated by block 282 in the flow diagram of FIG. 4.

Filtering system 190 can then perform general filtering on the data. This may be filtering that is done for some or all of the sensor data, such as to filter out outliers, to filter out various noise or other filtering. Performing general filtering on the aggregated and/or packaged data is indicated by block 284.

One or more of the data pipe generators then generate data for the different data pipes for which they were configured. This is indicated by block 286. In one example, the data pipe generators can be controlled so that they generate data sequentially. For instance, it may be that vehicle settings data pipe generator 196 is run first followed by the other data pipe generators, in sequence. In another example, all of the data pipe generators can be running simultaneously to generate the data pipes. The data pipe generators can generate the data pipes as requested, as needed, or continuously, or in other ways. This is indicated by block 288.

The present discussion will now proceed with respect to vehicle settings data pipe generator 196 generating a data pipe for vehicle settings control system 146. This is done by way of example only, and a similar description could be provided for each of the other data pipe generators as well. In the present example, data selector logic 210 then selects aggregated or packaged data for the vehicle settings data pipe that is to be generated. This is indicated by block 290. Filter identifier logic 212 then identifies the particular filter logic 192-194 that is to be applied to the selected data. It then applies the identified filter logic to the selected data to obtain filtered data. Identifying and applying pipe-specific filtering is indicated by block 292 in the flow diagram of FIG. 4.

Data pipe logic 214 then generates data, in the data pipe, in a form that is expected by the vehicle settings control system 146 in action generation system 140. Generating data as expected by the action system corresponding to the data pipe is indicated by block 294 in the flow diagram of FIG. 4. The data for the data pipes can be generated in other ways as well, and this is indicated by block 296.

At some point, trigger system 144 will detect trigger criteria indicating that one of the action systems in action generation system 140 is to receive data from its corresponding data pipe. Detecting this trigger is indicated by block 298 in the flow diagram of FIG. 4. Again, the receipt of data can be triggered when requested by a corresponding action system, or the corresponding action system can be configured to receive data continuously, through its data pipe, or the receipt of data can be based upon other trigger criteria. This is indicated by block 300 in the flow diagram of FIG. 4. Detecting a trigger indicating that data is to be received, through a data pipe, at action generation system 140 can be done in a wide variety of other ways as well, and this is indicated by block 302.

Vehicle settings control system 146 then receives data from the corresponding data pipe that was generated by vehicle settings data pipe generator 196, and provided by data pipe logic 214. Receiving the data from the corresponding data pipe is indicated by block 304 in the flow diagram of FIG. 4.

The settings control logic 162-164 then generates an action or control signal based upon the received data. This is indicated by block 306. By way of example, it may be that the data received by the corresponding data pipe indicates topology or path roughness. In that case, a settings control signal may be generated to reduce the speed of a corresponding vehicle 104-106, when it is approaching an area where the topological roughness exceeds a desired threshold. This is just one example of a vehicle settings control signal that can be generated, and this is indicated by block 308.

Each of the other action systems in action generation system 140 can generate an action and/or control signal based upon the data received through their corresponding data pipes as well. For instance, path control system 148 can generate a path control signal that identifies a particular path for a vehicle. It can then control the steering subsystem on that vehicle to follow the desired path. It can also, or instead, control a user interface display to display a desired path for a driver of the vehicle. Generating path control signals is indicated by block 310 in FIG. 4.

Sensor enhancement system 150 can generate sensor enhancement action or control signals to enhance the accuracy or range, or other characteristic, of an output from a sensor on a particular vehicle or set of vehicles. Providing a sensor enhancement control signal is indicated by block 312 in the flow diagram of FIG. 4.

Site status generation system 152 can generate site status control or action signals as well. For instance, it can generate a map or other indication indicating how a particular status item corresponding to worksite 114 currently exists, is changing, or has changed over time. These are only examples, and generating site status control signals is indicated by block 314 in the flow diagram of FIG. 4.

Action generation system 140 can generate action or control signals in other ways as well. This is indicated by block 316 in the flow diagram of FIG. 4.

The action generation system 140 then applies the signals to perform the desired action, or control operations, on the vehicles 104-106, in other systems 112, or elsewhere.

Applying the signals to perform the action and/or control operations is indicated by block 318 in the flow diagram of FIG. 4.

Architecture 100 continues operation until the operation is complete (e.g., until the operations at worksite 114 have ceased, until various phases controlled by the action generation system 140 have been completed, etc.). Continuing the operation until it is complete is indicated by block 320 in the flow diagram of FIG. 4.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays or other interfaces have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
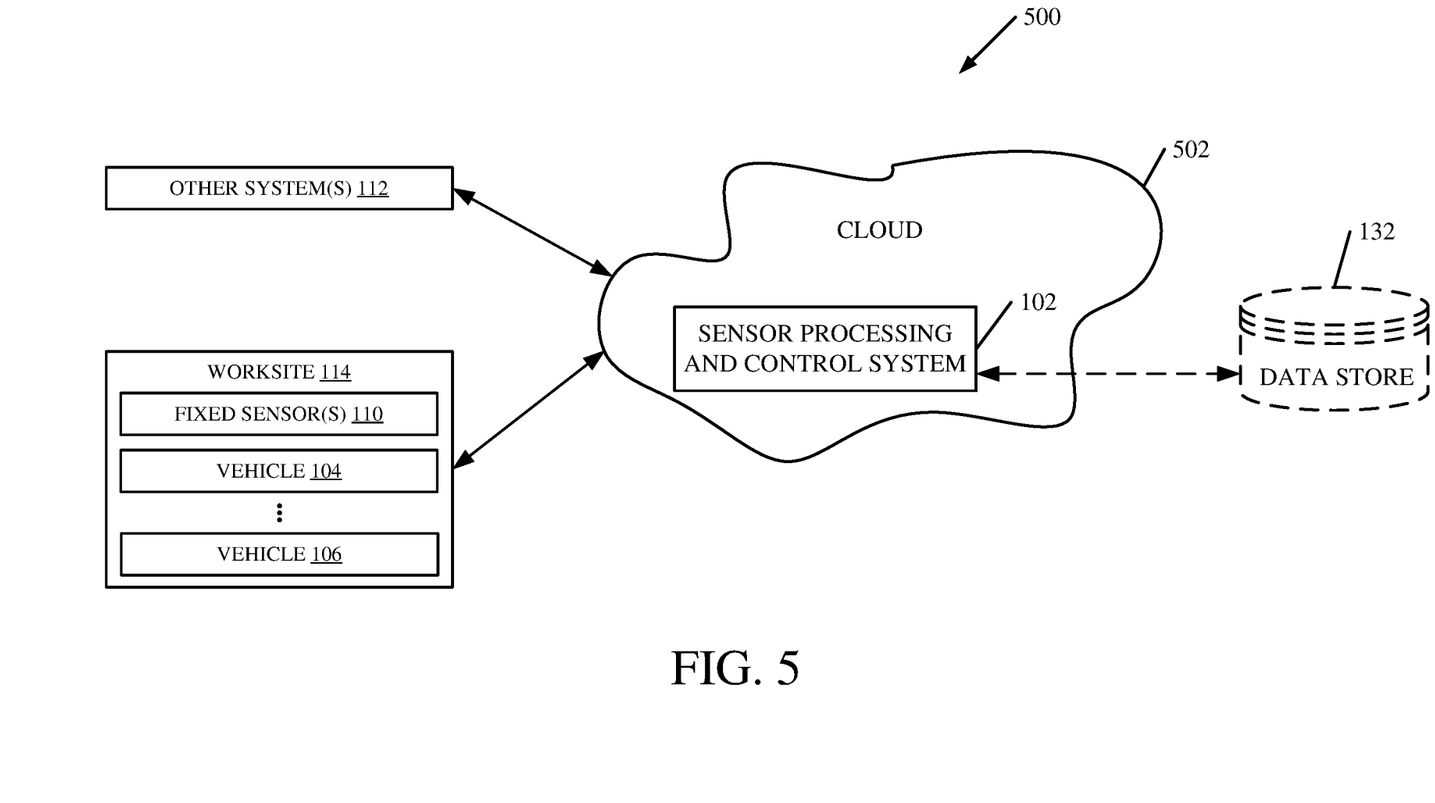
FIG. 5 is a block diagram showing one example of the architecture illustrated in FIG. 1, deployed in a remote server architecture.

FIG. 5 is a block diagram of machines 104-106, shown in FIG. 1, except that they communicate with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 5, some items are similar to those shown in FIG. 1 and they are similarly numbered. FIG. 5 specifically shows that sensor processing and control system 102 can be located at a remote server location 502. Therefore, machine 104-106 access those systems through remote server location 502.

FIG. 5 also depicts another example of a remote server architecture. FIG. 5 shows that it is also contemplated that some elements of FIG. 1 are disposed at remote server location 502 while others are not. By way of example, data store 132 or other systems 112 can be disposed at a location separate from location 502, and accessed through the remote server at location 502. Regardless of where they are located, they can be accessed directly by machines 104-106, through a network (either a wide area network or a local area network), they can be hosted at a remote site by a service, or they can be provided as a service, or accessed by a connection service that resides in a remote location.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
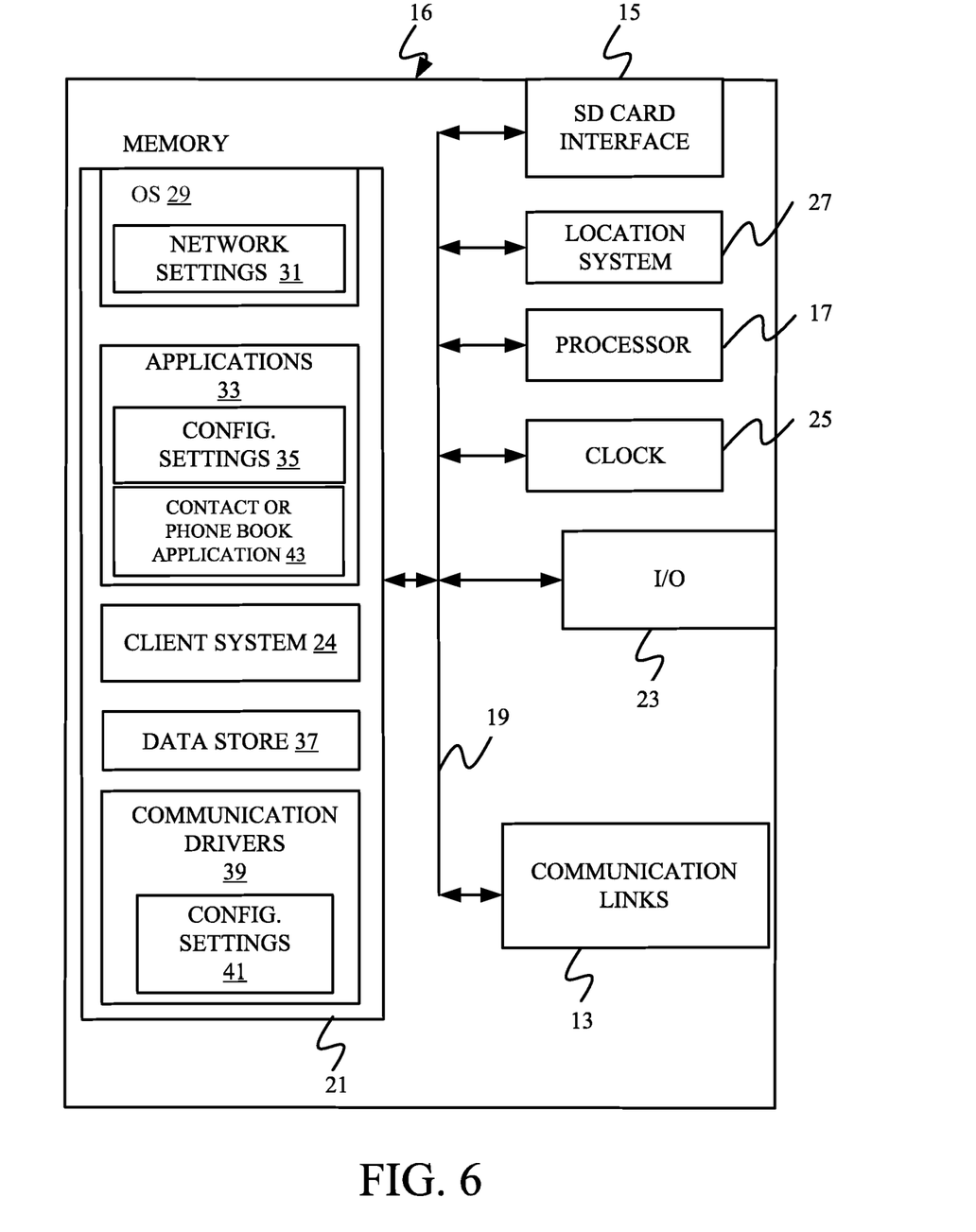
FIGS. 6-8 show examples of mobile devices that can be used in the architectures shown in the previous FIGS.
Figure 7:
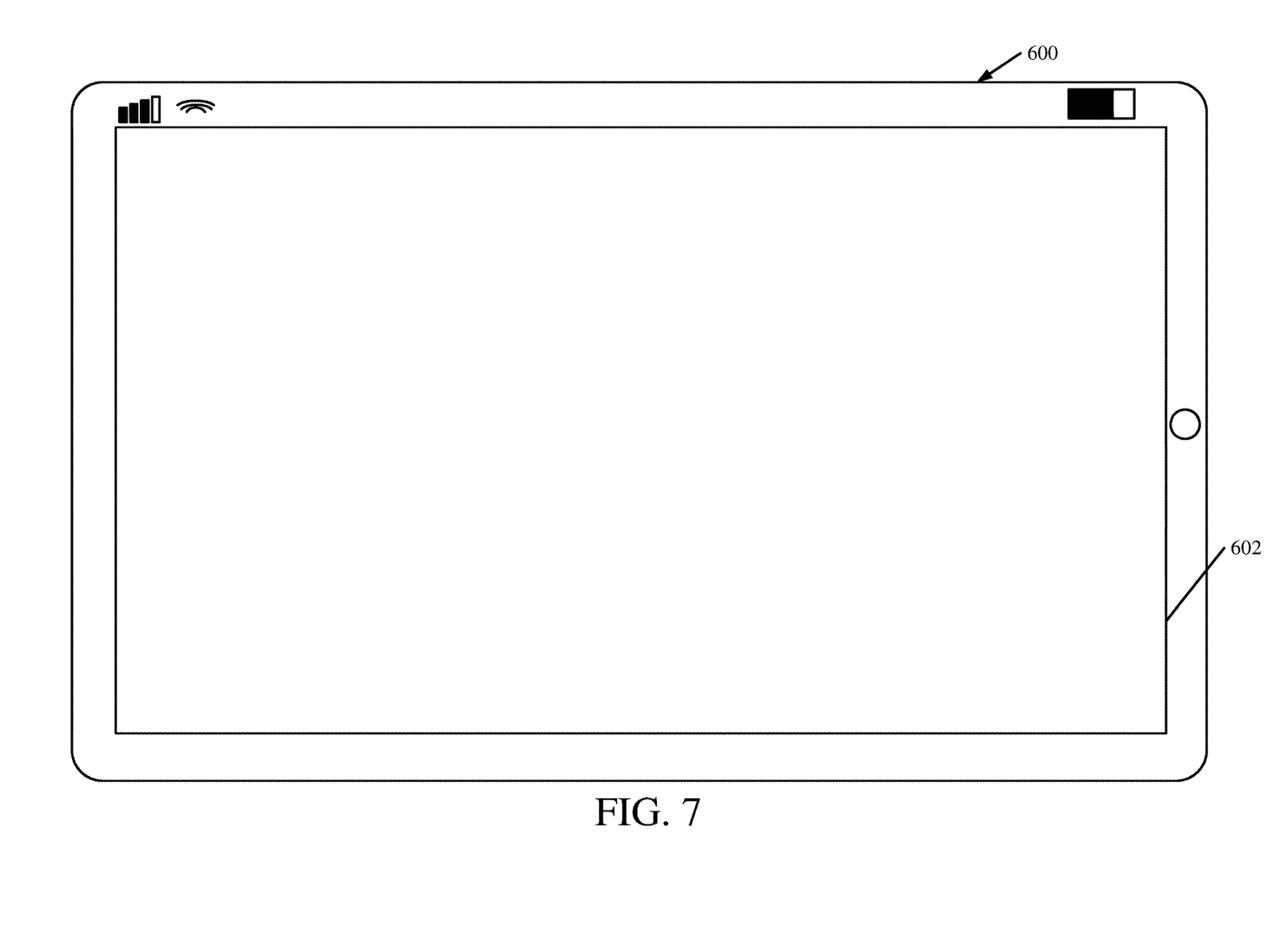
Figure 8:
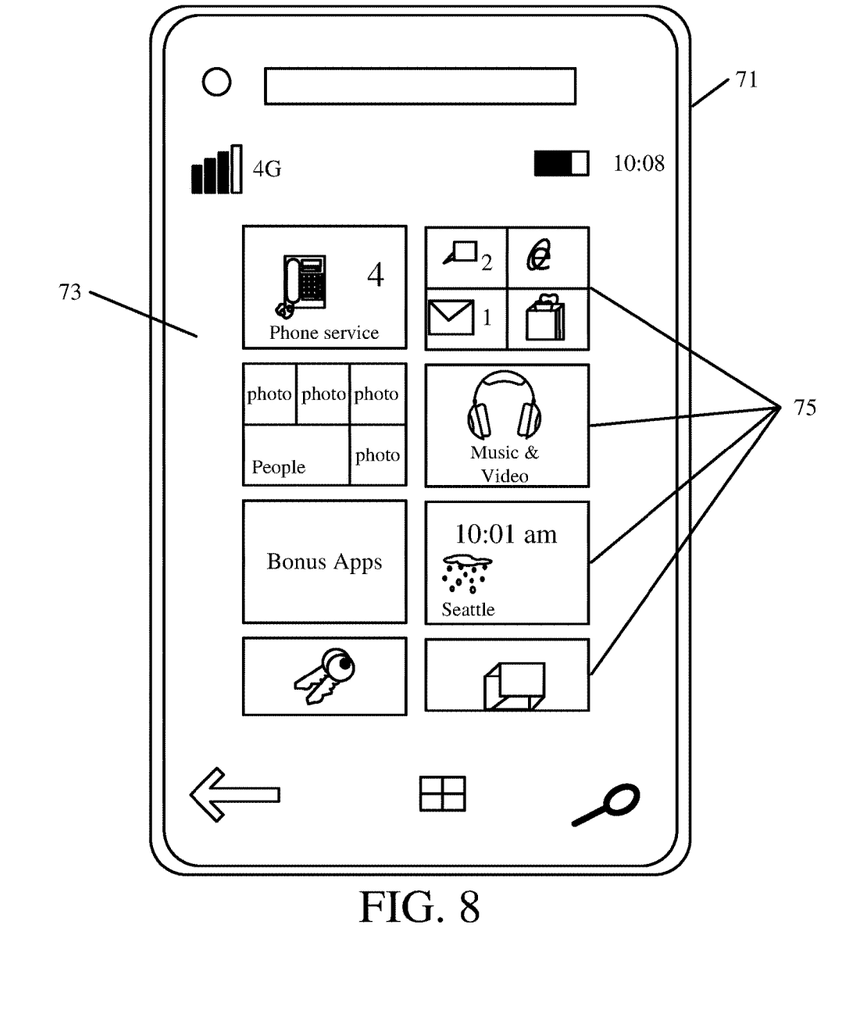
Figure 9:
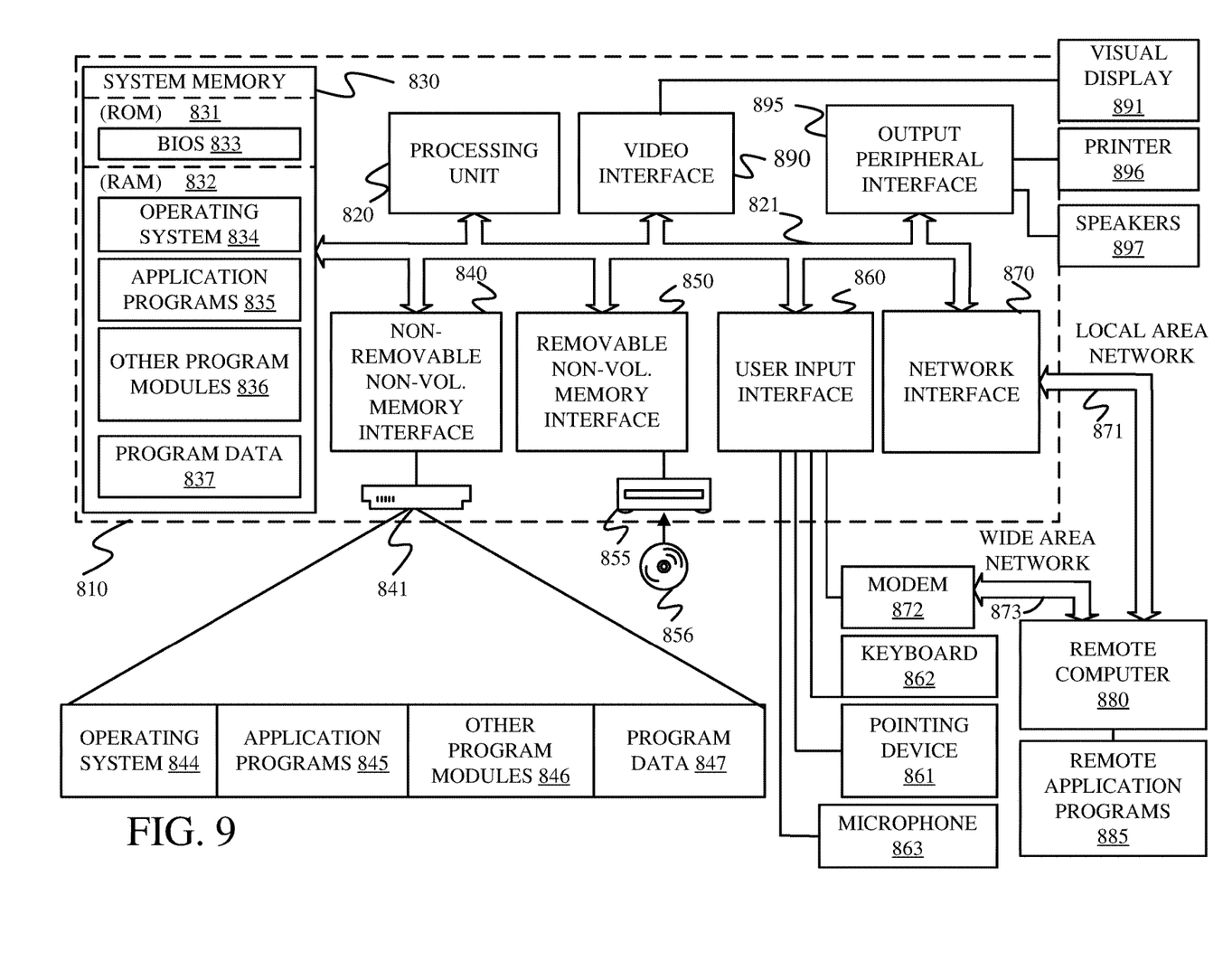
FIG. 9 is a block diagram showing one example of a computing environment that can be used in the architectures shown in the previous FIGS.

FIG. 6 is a simplified block diagram of one illustrative example of a handheld or mobile computing device that can be used as a user's or client's hand held device 16, in which the present system (or parts of it) can be deployed. For instance, a mobile device can be deployed in the operator compartment of machines 104-106 for use in generating, processing, or displaying the stool width and position data. FIGS. 7-9 are examples of handheld or mobile devices.

FIG. 6 provides a general block diagram of the components of a client device 16 that can run some components shown in FIG. 1, that interacts with them, or both. In the device 16, a communications link 13 is provided that allows the handheld device to communicate with other computing devices and in some examples provide a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 7 shows one example in which device 16 is a tablet computer 600. In FIG. 7, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 9 is one example of a computing environment in which elements of FIG. 1, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

It should also be noted that the different examples described herein can be combined in different ways. That is, parts of one or more examples can be combined with parts of one or more other examples. All of this is contemplated herein.

Example 1 is a vehicle control system, comprising:
a sensor data acquisition system that receives sensor data from a sensor on a plurality of different work machines at a worksite and that generates an acquired data signal indicative of the received sensor data;
a sensor data fusion system that receives the acquired data signal and generates a plurality of different data pipes, each data pipe providing different corresponding sensor data, based on the acquired data signal; and
an action generation system comprising a plurality of action systems, each action system being coupled to a different one of the plurality of different data pipes and generating an action signal based on the corresponding sensor data.

Example 2 is the vehicle control system of any or all previous examples wherein each of the plurality of different action systems comprises:
a plurality of items of action signal generation logic, each item of action signal generation logic generating a different action signal based on the sensor data corresponding to the data pipe to which it is coupled.

Example 3 is the vehicle control system of any or all previous examples wherein the sensor data fusion system comprises:
a vehicle settings data pipe generator configured to generate a vehicle settings data pipe that provides vehicle settings sensor data based on the acquired data signal.

Example 4 the vehicle control system of any or all previous examples wherein the action generation system, as one of the plurality of action systems, comprises:
a vehicle settings control system that receives the vehicle settings data from the vehicle settings data pipe and generates a vehicle settings control signal to control a setting on one of the plurality of different work machines based on the vehicle settings data Example 5 is the vehicle control system of any or all previous examples wherein the vehicle settings control system comprises:
a plurality of different items of settings control logic, each generating a different settings control signal based on the vehicle settings data.

Example 6 is the vehicle control system of any or all previous examples wherein the sensor data fusion system comprises:
a path control data pipe generator configured to generate a path control data pipe that provides path control sensor data based on the acquired data signal.

Example 7 is the vehicle control system of any or all previous examples wherein the action generation system, as one of the plurality of action systems, comprises:
a path control system that includes a plurality of different items of path control logic, each generating a different path control signal to control a path on a different one of the plurality of different work machines based on the path control sensor data.

Example 8 is the vehicle control system of any or all previous examples wherein the sensor data fusion system comprises:
a sensor enhancement data pipe generator configured to generate a sensor enhancement data pipe that provides sensor enhancement sensor data based on the acquired data signal.

Example 9 is the vehicle control system of any or all previous examples wherein the action generation system, as one of the plurality of action systems, comprises:
a sensor enhancement system that includes a plurality of different items of enhancement logic, each generating a different sensor enhancement signal to enhance accuracy of a different sensor on the plurality of different work machines based on the sensor enhancement data.

Example 10 is the vehicle control system of any or all previous examples wherein the sensor data fusion system comprises:
a site status data pipe generator configured to generate a site status data pipe that provides site status data based on the acquired data signal.

Example 11 is the vehicle control system of any or all previous examples wherein the action generation system, as one of the plurality of action systems, comprises:
a site status generation system that includes a plurality of different items of status logic, each generating a different site status signal to generate a site status indicator indicative of a different site status variable based on the site status data.

Example 12 is the vehicle control system of any or all previous examples and further comprising:
action interface logic configured to expose a configuration/extension interface and detect user interactions with the configuration/extension interface to add or configure one of the items of action signal generation logic to generate a different action signal.

Example 13 is the vehicle control system of any or all previous examples wherein the sensor data fusion system comprises:
fusion interface logic configured to expose a fusion configuration/extension interface and detect user interactions with the fusion configuration/extension interface to add or configure a data pipe generator to generate a different data pipe.

Example 14 is a method of generating a control signal, comprising:

receiving sensor data from a sensor on a plurality of different work machines at a worksite;

generating an acquired data signal indicative of the received sensor data;

generating a plurality of different data pipes, each data pipe providing different corresponding sensor data, based on the acquired data signal, by selectively aggregating and filtering the received sensor data for each data pipe; and generating an action signal with each of a plurality of action systems, each action system being coupled to a different one of the plurality of different data pipes, based on the corresponding sensor data.

Example 15 is the method of any or all previous examples wherein generating an action signal comprises:

generating a different action signal with each of a plurality of items of action signal generation logic, based on the sensor data corresponding to the data pipe to which the item of action signal generation logic is coupled.

Example 16 is the method of any or all previous examples wherein generating a plurality of data pipes comprises:

generating a vehicle settings data pipe that provides vehicle settings sensor data based on the acquired data signal;

generating a path control data pipe that provides path control sensor data based on the acquired data signal;

generating a sensor enhancement data pipe that provides sensor enhancement sensor data based on the acquired data signal; and generating a site status data pipe that provides site status data based on the acquired data signal.

Example 17 is the method of any or all previous examples wherein generating a different action signal comprises:

receiving the vehicle settings data from the vehicle settings data pipe; and generating a vehicle settings control signal to control a setting on one of the plurality of different work machines based on the vehicle settings data.

Example 18 is the method of any or all previous examples wherein generating a different action signal comprises:

receiving the path control sensor data from the path control data pipe; and generating a different path control signal to control a path of a different one of the plurality of different work machines based on the path control sensor data.

Example 19 is the method of any or all previous examples wherein generating a different action signal comprises:

receiving the sensor enhancement sensor data from the sensor enhancement data pipe;

receiving the status data from the site status data pipe;

generating a sensor enhancement signal to enhance accuracy of a sensor on the plurality of different work machines based on the sensor enhancement data; and generating a site status signal to generate a site status indicator indicative of a site status variable based on the site status data.

Example 20 is an extendable and configurable control system, comprising:

a sensor data acquisition system that receives sensor data from a sensor on a plurality of different work machines at a worksite and that generates an acquired data signal indicative of the received sensor data;

a sensor data fusion system that receives the acquired data signal and generates a plurality of different data pipes, each data pipe providing different corresponding sensor data, based on the acquired data signal;

fusion interface logic configured to expose a fusion configuration/extension interface and detect user interactions with the fusion configuration/extension interface to add and configure a data pipe generator to generate each of the plurality of different data pipes;

an action generation system comprising a plurality of action systems, each action system being coupled to a different one of the plurality of different data pipes and generating a corresponding action signal based on the corresponding sensor data; and action interface logic configured to expose a configuration/extension interface and detect user interactions with the configuration/extension interface to add and configure one of the action systems to generate the corresponding action signal.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A vehicle control system, comprising:
one or more processors; and
a data store that stores a set of computer executable instructions that, when executed by the one or more processors, configure the one or more processors to implement:
    a sensor data acquisition system that:
        receives respective sensor data from each of a plurality of different sensors, each sensor of the plurality of sensors being on a different one of a plurality of work machines at a worksite, the respective sensor data from each sensor being indicative of a same worksite characteristic; and
        generates a plurality of acquired data signals indicative of the received respective sensor data;
    a sensor data fusion system that:
        receives the plurality of acquired data signals and packages the plurality of respective sensor data to form a plurality of packaged data subsets, each packaged data subset of the plurality of packaged data subsets being different than the other packaged data subsets of the plurality of packaged data subsets; and
        generates a plurality of different data pipes, each data pipe of the plurality of different data pipes being configured to receive one of the packaged data subsets of the plurality of packaged data subsets; and
    an action generation system configured to generate a map of the worksite indicative of the worksite characteristic at different locations in the worksite based on the plurality of respective sensor data, the action generation system comprising:
        a plurality of action systems, each action system being coupled to a different one of the plurality of different data pipes and configured to generate an action signal based on the packaged data subset received in the data pipe and apply the action signal to control one or more of the plurality of different work machines to perform an action based on the action signal.

2. The vehicle control system of claim 1 wherein each of the plurality of different action systems comprises:
a plurality of items of action signal generation logic, each item of action signal generation logic generating a different action signal based on the packaged data subset corresponding to the data pipe to which it is coupled.

3. The vehicle control system of claim 2 wherein the sensor data fusion system comprises:
a vehicle settings data pipe generator configured to generate a vehicle settings data pipe that provides vehicle settings sensor data based on the respective sensor data.

4. The vehicle control system of claim 3 wherein the action generation system, as one of the plurality of action systems, comprises:
a vehicle settings control system that receives the vehicle settings data from the vehicle settings data pipe and generates a vehicle settings control signal to control a setting on one of the plurality of different work machines based on the vehicle settings data.

5. The vehicle control system of claim 4 wherein the vehicle settings control system comprises:
a plurality of different items of settings control logic, each generating a different settings control signal based on the vehicle settings data.

6. The vehicle control system of claim 2 wherein the sensor data fusion system comprises:
a path control data pipe generator configured to generate a path control data pipe that provides path control sensor data based on the respective sensor data.

7. The vehicle control system of claim 6 wherein the action generation system, as one of the plurality of action systems, comprises:
a path control system that includes a plurality of different items of path control logic, each generating a different path control signal to control a path on a different one of the plurality of different work machines based on the path control sensor data.

8. The vehicle control system of claim 2 wherein the sensor data fusion system comprises:
a sensor enhancement data pipe generator configured to generate a sensor enhancement data pipe that provides sensor enhancement sensor data based on the respective sensor data.

9. The vehicle control system of claim 8 wherein the action generation system, as one of the plurality of action systems, comprises:
a sensor enhancement system that includes a plurality of different items of enhancement logic, each generating a different sensor enhancement signal to enhance accuracy of a different sensor on the plurality of different work machines based on the sensor enhancement data.

10. The vehicle control system of claim 2 wherein the sensor data fusion system comprises:
a site status data pipe generator configured to generate a site status data pipe that provides site status data based on the respective sensor data.

11. The vehicle control system of claim 10 wherein the action generation system, as one of the plurality of action systems, comprises:
a site status generation system that includes a plurality of different items of status logic, each generating a different site status signal to generate a site status indicator indicative of a different site status variable based on the site status data.

12. The vehicle control system of claim 2, wherein the set of computer executable instructions, when executed by the one or more processors, further configure the one or more processors to implement:
action interface logic configured to expose a configuration/extension interface and detect user interactions with the configuration/extension interface to add or configure one of the items of action signal generation logic to generate a different action signal.

13. The vehicle control system of claim 2 wherein the sensor data fusion system comprises:
fusion interface logic configured to expose a fusion configuration/extension interface and detect user interactions with the fusion configuration/extension interface to add or configure a data pipe generator to generate a different data pipe.

14. A method of generating a control signal, comprising:
receiving respective sensor data from each of a plurality of different sensors, each sensor of the plurality of sensors being on a different one of a plurality of work machines at a worksite, the respective sensor data from each sensor being indicative of a same worksite characteristic;
generating a plurality of acquired data signals indicative of the received respective sensor data;
generating a plurality of different data pipes, each data pipe providing a different set of the respective sensor data by selectively aggregating and filtering the received respective sensor data for each data pipe;
generating a map of the worksite based on the respective sensor data from the plurality of different work machines, wherein generating the map comprises generating a site status map indicative of the same worksite characteristic at different locations in the worksite;
generating an action signal with each of a plurality of action systems, each action system being coupled to a different one of the plurality of different data pipes, based on the respective sensor data; and
applying the action signal to control at least one of the plurality of different work machines.

15. The method of claim 14 wherein receiving the respective sensor data comprises receiving, from each sensor on each of the plurality of different work machines, vehicle pathing data indicative of paths traveled by each different work machine at the worksite from a first time to a current time.

16. The method of claim 15 wherein generating the site status map comprises generating the site status map indicating current and historical paths for each different work machine at the worksite from the first time to a current time based on the vehicle pathing data.

17. The method of claim 15 wherein receiving the respective sensor data further comprises receiving vehicle load data indicative of a load carried by each of the different work machines and wherein generating the site status map comprises generating the site status map indicative of a change in compaction of the worksite.

18. The method of claim 14 wherein generating the site status map comprises generating the site status map indicative of a change in a topography of the worksite from a first time to a current time.

19. An extendable and configurable control system, comprising:
one or more processors; and
a data store that stores computer executable instructions that, when executed by the one or more processors, configure the one or more processors to implement:

a sensor data acquisition system that receives sensor data from a sensor on a plurality of different work machines at a worksite and that generates an acquired data signal indicative of the received sensor data, the sensor data including vehicle load data indicative of a load carried by each of the different work machines;

a sensor data fusion system that receives the acquired data signal and generates a plurality of different data pipes, each data pipe providing different corresponding sensor data, based on the acquired data signal;

fusion interface logic configured to expose a fusion configuration/extension interface and detect user interactions with the fusion configuration/extension interface to add and configure a data pipe generator to generate each of the plurality of different data pipes;

a site status generation system configured to generate a site status map indicative of a change in compaction of the worksite;

an action generation system comprising a plurality of action systems, each action system being coupled to a different one of the plurality of different data pipes and generating a corresponding action signal based on the corresponding sensor data; and action interface logic configured to expose a configuration/extension interface and detect user interactions with the configuration/extension interface to add and configure one of the action systems to generate the corresponding action signal to control the plurality of different work machines.

* * * * *